March 31, 1936.  S. OTTENSTEIN  2,035,757

ELECTRICAL HEATING APPARATUS

Filed Aug. 17, 1934

Inventor:
Simon Ottenstein,
by Harry E. Dunham
His Attorney.

Patented Mar. 31, 1936

2,035,757

UNITED STATES PATENT OFFICE 2,035,757

ELECTRICAL HEATING APPARATUS

Simon Ottenstein, Nuremberg, Germany, assignor to General Electric Company, a corporation of New York Application August 17, 1934, Serial No. 740,314
In Germany August 29, 1933

2 Claims. (Cl. 219—35)

This invention relates to electrical heating apparatus, more particularly to electrically heated ovens, and it has for its object the provision of improved apparatus of this character.

This invention contemplates the provision of an improved electrically heated oven and like heating device wherein the heating elements are arranged on the exterior of the heating chamber, rather than on the interior thereof, as has been the custom heretofore. The invention further contemplates the provision of improved means supporting the heating elements in intimate mechanical and thermal relation with the exterior surfaces of the walls of the heating chamber so as to eliminate to a great extent the heat drop caused by air spaces between the heating elements and the walls being heated.

In accordance with this invention, in one form thereof, suitable channel-shaped supporting members are secured to the exterior walls of the heating chamber. Preferably, the channel supporting members will be provided with flanges that are secured to the walls in good heat conducting relation with the walls by means of welding, soldering or equivalent securing means. In certain cases they may be riveted or soldered to the walls. The heating elements, which preferably will be of the sheathed type, are positioned in the channel-shaped members in good thermal and mechanical relation with the walls to be heated. Preferably, the channel-supporting members will have substantially the same shape and cross-section as have the heating elements, and these supporting members will be so proportioned that the heating elements will be held tightly against the walls to be heated, but not so tightly as to prevent the elements being pushed into position in the channel members.

Figure 1:
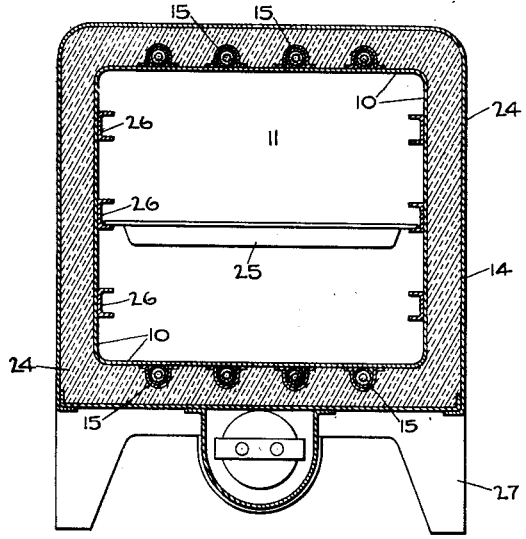
Figure 2:
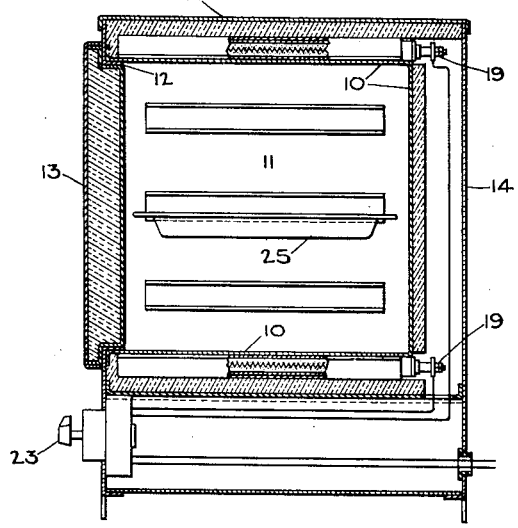
Figure 3:
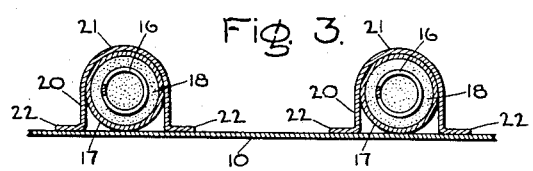

For a more complete understanding of this invention, reference should be had to the accompanying drawing in which Fig. 1 is a vertical sectional view of an electrically heated oven embodying this invention; Fig. 2 is a vertical sectional view of the oven shown in Fig. 1, but taken through a line substantially at right angles to the section of Fig. 1; and Fig. 3 is a sectional view on an enlarged scale of a portion of the oven shown in Figs. 1 and 2.

Referring to the drawing, this invention has been shown as applied to an electrically heated oven comprising inner walls 10 defining a heating chamber 11 of substantially rectangular shape provided with a front opening 12 therein, as shown in Figs. 1 and 2. The front opening 12 is closed by means of a suitable door or cover member 13. Arranged in spaced relation with the inner walls 10 defining the heating chamber 11 are outer walls 14 defining a casing or outer covering enveloping the top, bottom, end and side walls of the heating chamber, as shown in the drawing.

Suitable heating elements 15 are arranged on the exterior of the inner walls 10 so as to apply heat to these walls, which in turn function to heat the interior of the heating chamber 11. As shown, a plurality of heating elements 15 are arranged longitudinally on the top and bottom inner walls 10 of the heating chamber, and spaced substantially at equal intervals transversely of these walls. While any suitable heating elements may be used, it is preferable to use heating elements of the sheathed type, such as described and claimed in U. S. patent to C. C. Abbott, No. 1,494,936, dated February 1, 1921. Briefly, this element comprises a helical resistance element 16 (Fig. 3) mounted within a metallic sheath 17 and embedded in and supported in spaced relation with respect to the sheath by means of an electrically insulating, heat refractory and conducting material 18, such as powdered magnesium oxide. This oxide is compacted to a hard dense mass so as to readily conduct heat from the resistance element 18 to the sheath. The oxide may be thus compacted by reducing the diameter of the sheath after it has been loaded with the oxide by swaging or rolling, as pointed out in detail in the above-mentioned Abbott patent. This heater is arranged with its terminals 19 at one end of the heater.

The heating elements are supported in good mechanical and thermal relation with the adjacent wall portions 10 by means of suitable supporting members 20. As shown, each supporting member 20 is provided with a channel-shaped body portion 21, which in cross-section has substantially the same shape as has the associated heating element 15, and which is provided with out-turned flanges 22 arranged substantially flush with the adjacent surface of the associated wall 10.

The flanges 22 are mechanically connected to the wall 10 so as to provide a very good thermal path between the supporting member 20 and the wall. For this purpose, the flanges will be secured to the wall by means of welding, soldering or like process, and in some cases they may be riveted or screwed to the wall, if these latter forms of attachment are preferred.

The heating element 15 and its supporting member 20 will be so proportioned that the heating element will be forced into good thermal and mechanical contact both with the supporting member and with the associated wall 10. The dimensions of these members, however, will be such that the heating element may be slid or forced into the space provided by the body portion 21 of the support 20 and the cooperating wall portion 10.

The heating elements 15 are controlled by means of a suitable switch 23, preferably arranged so as to effect different rates of heat generation by movement to successive controlling positions.

The spaces between adjacent heating elements 15 and between the inner walls 10 and the outer walls 14 are completely filled with a suitable heat insulating material 24, such as rock-wool.

The oven is provided with a suitable pan or rack 25 upon which the edibles to be baked are placed. The pan 25, as shown, is supported in suitable slides 26. Several sets of slides 26 are provided for supporting the pan 25 in different positions in the heating chamber.

The oven is supported in an elevated position upon suitable legs 27.

While I have shown a particular embodiment of my invention, it will be understood, of course, that I do not wish to be limited thereto since many modifications may be made, and I, therefore, contemplate by the appended claims to cover any such modifications as fall within the true spirit and scope of my invention.

What I claim as new and desire to secure by Letters Patent of the United States, is:

1. An electric oven comprising walls defining a substantially rectangular heating chamber having a front opening therein, a plurality of metallic supporting members on the outer surfaces of the top and bottom walls of said heating chamber spaced at intervals cross-wise of said walls and arranged longitudinally thereof, each supporting member having a channel-shaped body portion extending substantially through the full depth of said heating chamber and having flanges projecting from said body member flush with the outer surfaces of said top and bottom walls, means rigidly securing said flanges to said walls, a plurality of separate metallically sheathed heating units arranged within said channel-shaped body portions fitted tightly therein in good thermal relation therewith and with said walls, a plurality of walls defining a substantially rectangular casing for said heating chamber spaced from said chamber and heat insulating material filling the spaces between said walls and also the spaces between said metallic supporting members.

2. An electrically heated oven comprising inner metallic walls defining a heating chamber, outer metallic walls spaced from said inner walls defining a casing for said heating chamber arranged in spaced relation with it, metallic channel-like supporting members within the space between said walls, means securing said supporting members to the outer surfaces of said inner walls, sheathed heating elements fitted into said channel-like supporting members in good thermal relation with said members and said inner walls, each heating element having a resistance element within its sheath and powdered heat conducting and refractory, electrically insulating material embedding said heating element and supporting it in spaced relation with the walls of said sheath and compacted to a hard dense mass in said sheath so as to readily conduct heat from said resistance element to said sheath and said walls of said oven and said supporting members, and heat insulating material arranged about the outer surfaces of said supporting members filling the spaces between them and also between said inner and outer walls.

SIMON OTTENSTEIN.